(12) United States Patent
Goddard et al.

(10) Patent No.: US 7,325,191 B2
(45) Date of Patent: Jan. 29, 2008

(54) PRESERVATION OF SOURCE CODE FORMATTING

(75) Inventors: Kirk S. Goddard, Sammamish, WA (US); Wai Hang Tang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 10/730,386

(22) Filed: Dec. 8, 2003

(65) Prior Publication Data

US 2005/0125730 A1 Jun. 9, 2005

(51) Int. Cl.
G06F 17/00 (2006.01)

(52) U.S. Cl. .................................. 715/517; 715/540

(58) Field of Classification Search ............... 715/531, 715/501.1, 517, 540, 513; 709/203, 245, 709/219, 217, 224, 227; 707/104.1
See application file for complete search history.

(56) References Cited

U.S. PATENT DOCUMENTS

| 5,428,721 | A | * | 6/1995 | Sato et al. | 345/650 |
| 5,555,362 | A | * | 9/1996 | Yamashita et al. | 715/517 |
| 5,694,609 | A | * | 12/1997 | Murata | 715/513 |
| 5,884,097 | A | * | 3/1999 | Li et al. | 710/43 |
| 5,895,476 | A | * | 4/1999 | Orr et al. | 715/517 |
| 5,895,477 | A | * | 4/1999 | Orr et al. | 715/517 |
| 5,903,902 | A | * | 5/1999 | Orr et al. | 715/517 |
| 5,956,737 | A | * | 9/1999 | King et al. | 715/517 |
| 6,336,124 | B1 | * | 1/2002 | Alam et al. | 715/523 |
| 6,732,102 | B1 | * | 5/2004 | Khandekar | 707/10 |
| 6,950,987 | B1 | * | 9/2005 | Hargraves et al. | 715/523 |
| 6,996,780 | B2 | * | 2/2006 | Estrada | 715/751 |
| 2001/0018697 | A1 | * | 8/2001 | Kunitake et al. | 707/517 |
| 2003/0079177 | A1 | * | 4/2003 | Brintzenhofe et al. | 715/500 |
| 2003/0233621 | A1 | * | 12/2003 | Paolini et al. | 715/522 |

OTHER PUBLICATIONS

Stonebraker, Michael, et al, "Content Integration for E-Business", ACM SIGMOD Record, vol. 30, Issue 2, May 2001, pp. 552-560.*
Arnon, D.S. et al., "A Document Manipulation System Based on Natural Semantics", Mathl. Comput. Modeling, 1997, 25(4), 37-56.
Boeve, E. et al., "WYSIWYG Editors: And What Now?", Human-Computer Interaction, Third International Conference, EWHCI, 1993, 68-82.
Hill, C., "Markup Meets the Mainstream: The Future of Content-Based Processing", Asterisk. The Journal of Computer Documentation, 1997, 21(3), 32-35.
Myers, E.W., "An O(ND) Difference Algorithm and Its Variations", Algorithmica, 1986, 1, 251-266.
Heckel, P., "A Technique for Isolating Differences Between Files", Communications of the ACM, 1978, 21(4), 264-268.
Jain, P., "Creating XML from Microsoft Word: The Challenges", XML-GCA(Graphic Communications Association), 2000, 136-144.

* cited by examiner

Primary Examiner—William Bashore
Assistant Examiner—Laurie Ries
(74) Attorney, Agent, or Firm—Woodcock Washburn LLP (57) ABSTRACT

Documents before and after editing are compared. Changes are applied to the original document, thus preserving the existing formatting.

20 Claims, 11 Drawing Sheets

| | | | | | |
|---|---|---|---|---|---|
| 1 | <%@... id=1> | | a | <%@... id=1> | u |
| 2 | <HTML id=2> | /710 | b | <HTML id=2> | u |
| 3 | <HEAD id=3> | d10 | c | <BODY id=7> | u |
| 4 | something | d 1 | d | I | m 4 rep w/ 11 |
| 5 | <TITLE id=4> | d | e | like | m 5 rep w/ 12 |
| 6 | Foo | d 2 | f | James | m 6 |
| 7 | Bar | d 3 | g | <img id=10> | u |
| 8 | </TITLE id=5> | d | h | <p id=8> | u |
| 9 | </HEAD id=6> | d | i | army | u 7 rep w/ 15 |
| 10 | <BODY id=7> | | j | marines | i    13 |
| 11 | I | 4 rep w/ d | k | boots | u 9 rep w/ 17 |
| 12 | like | 5 rep w/ e | l | </p id=9> | u |
| 13 | James | 6 | m | James | m    6 |
| 14 | <p id=8> | | n | hates | i    14 |
| 15 | army | 7 rep w/ i | o | me | u    10 |
| 16 | navy | d 8 | p | somewhat | u    11 |
| 17 | boots | 9 rep w/ k | q | I | m    4 |
| 18 | </p id=9> | | r | say | u    12 |
| 19 | James | | s | </BODY id=11> | u |
| 20 | like | d | t | </HTML id=12> | u |
| 21 | me | 10 | | | |
| 22 | <img id=10> | | Array (new file) 704 | | |
| 23 | somewhat | 11 | | | |
| 24 | I | 4 | | | |
| 25 | say | 12r | | | |
| 26 | </BODY id=11> | | | | |
| 27 | </HTML id=12> | | | | |

Array (old file) 702

Legend:
U=unique
m=match
i=insert
d=delete

■ \<html\>\<body\>hello world\</body\>\</html\>

Fig. 6

| | | | | | | |
|---|---|---|---|---|---|---|
| 1 | <%@... id=1> | | a | <%@... id=1> | u | |
| 2 | <HTML id=2> | /710 | b | <HTML id=2> | u | |
| 3 | <HEAD id=3> | d 1 | c | <BODY id=7> | u | |
| 4 | something | d 1 | d | I | m 4 rep w/ 11 | |
| 5 | <TITLE id=4> | d | e | like | m 5 rep w/ 12 | |
| 6 | Foo | d 2 | f | James | m 6 | |
| 7 | Bar | d 3 | g | <img id=10> | u | |
| 8 | </TITLE id=5> | d | h | <p id=8> | u | |
| 9 | </HEAD id=6> | d | i | army | u 7 rep w/ 15 | |
| 10 | <BODY id=7> | | j | marines | i | 13 |
| 11 | I | 4 rep w/ d | k | boots | u 9 rep w/ 17 | |
| 12 | like | 5 rep w/ e | l | </p id=9> | u | |
| 13 | James | 6 | m | James | m | 6 |
| 14 | <p id=8> | | n | hates | i | 14 |
| 15 | army | 7 rep w/ i | o | me | u | 10 |
| 16 | navy | d 8 | p | somewhat | u | 11 |
| 17 | boots | 9 rep w/ k | q | I | m | 4 |
| 18 | </p id=9> | | r | say | u | 12 |
| 19 | James | | s | </BODY id=11> | u | |
| 20 | like | d | t | </HTML id=12> | u | |
| 21 | me | 10 | | | | |
| 22 | <img id=10> | | Array (new file) 704 | | | |
| 23 | somewhat | 11 | | | | |
| 24 | I | 4 | | | | |
| 25 | say | 12r | | | | |
| 26 | </BODY id=11> | | | | | |
| 27 | </HTML id=12> | | | | | |

Array (old file) 702

Legend:
U=unique
m=match
i=insert
d=delete

Fig. 7a

Symbol Table 706

| | | OCNO | /710 | OC/712 | NC | |
|---|---|---|---|---|---|---|
| 1 | something | 4 | | 1 | | (deleted) |
| 2 | Foo | 6 | | 1 | | (deleted) |
| 3 | Bar | 7 | | 1 | | (deleted) |
| 4 | I | 11, 24, | | 2 | 2 | (match) |
| 5 | like | 12, 20, | | 2 | 1 | (match, deleted) |
| 6 | James | 13, 19, | | 2 | 2 | (match) |
| 7 | army | 15 | | 1 | 1 | (unmodified) |
| 8 | navy | 16 | | 1 | | (deleted) |
| 9 | boots | 17 | | 1 | 1 | (unmodified) |
| 10 | me | 21 | | 1 | 1 | (unmodified) |
| 11 | somewhat | 23 | | 1 | 1 | (unmodified) |
| 12 | say | 25 | | 1 | 1 | (unmodified) |
| 13 | marines | | | | 1 | (insert) |
| 14 | hates | | | | 1 | (insert) |

Fig. 7b

PRESERVATION OF SOURCE CODE FORMATTING

FIELD OF THE INVENTION

The invention relates to computing and in particular to preserving the original formatting in edited source code.

BACKGROUND OF THE INVENTION

Today's Integrated Development Environments (IDEs) and their associated editors frequently provide a number of tools that have multiple presentation modes. Many IDEs enable a developer to actually create code using visual designers (for example, WYSIWYG or "What You See is What You Get" designers) in additional to providing traditional text editing tools. Unfortunately, once a user is satisfied with the formatting of this source code, using some tools to modify or operate on the source code can result in loss of formatting.

For example, an IDE may have two distinct display modes in which the user may view and edit source code such as HTML (Hyper-Text Markup Language) documents: a source view in which the user can see and edit his HTML source code directly and a design view in which the user can see how the HTML may be rendered by a browser. This, of course, is a very useful feature since HTML documents are not rendered as typed. Instead special markup tags provide instructions to the browser with respect to how a section of HTML should be rendered on screen. In general, HTML is rendered in accordance with the markup tags, irrespective of placement of carriage returns, line feeds and other white space characters in the HTML document.

For example, the <p> markup tag instructs the browser to place text within a single paragraph that fits the width of the user's browser display on the page, followed by a line and the next paragraph. Thus:
<p>Hello</p><p>Goodbye</p>may be rendered thusly:

---
Hello
Goodbye
---

Unfortunately, the design view experience can lead to code insertion and movement of markup in the saved HTML stream that is not the way the user may have meant it to be. Upon return to source view, this "extra" formatting such as carriage returns and other spacing may be lost.

For example, the HTML:

---
<p>
   Now is the time
   For all good men
   To come to the aid of their country.
   </p>
--- might be rendered in a browser as follows:

---
Now is the time For all good men To come to the aid of their country.
---

Suppose the user switched to design mode and while in design mode, changed "men" to "women". When he returns to source mode, he is likely to find the following HTML:

<p>Now is the time For all good women To come to the aid of their country.</p>

Because the formatting of the HTML between the markup tags <p> and </p> is for the benefit of the HTML code developer, and has no effect on the browser, typically design modes do not preserve the formatting the user originally provided.

One could view the different display modes as black boxes which accept and save HTML text streams upon entering and leaving the black box. When the user is finished with one mode or black box, the resultant page can be saved as an HTML stream which can be then be loaded into the next mode or black box. It would be helpful if there were a way to restore the original format of the HTML stream (or other source code) whenever possible whenever automatic markup generation or modification has occurred.

SUMMARY OF THE INVENTION

Documents before and after editing are compared. Changes are applied to the original document, thus preserving the existing formatting. Source code formatting is preserved by determining the differences between code that has been read into a designer and code that is output at the end of design mode editing. By determining the differences between the files, any formatting characters such as carriage return, linefeed, space and tab can be restored.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 5a-5f are illustrations of exemplary files with respect to source code formatting preservation in accordance with one embodiment of the invention;

DETAILED DESCRIPTION OF ILLUSTRATIVE EMBODIMENTS

Overview

Documents before and after editing are compared. Changes are applied to the original document, preserving the original formatting.

Existing files are compared, and an attempt is made to associate blocks of text in one file with blocks of text in another file. The following observations are made:

1. A text block that occurs once and only once in each file must be the same text block (although the text block may have been moved). This finds most blocks and excludes them from further consideration.

2. If, immediately adjacent to a "unique found" block pair (one block in each file) there are blocks identical to each other, these blocks must be the same block. The process is applied forwards and backwards iteratively from unique blocks to find sequences of unchanged blocks. By applying these observations, mappings between blocks in the two files can be generated.

Exemplary Computing Environment

Figure 1:
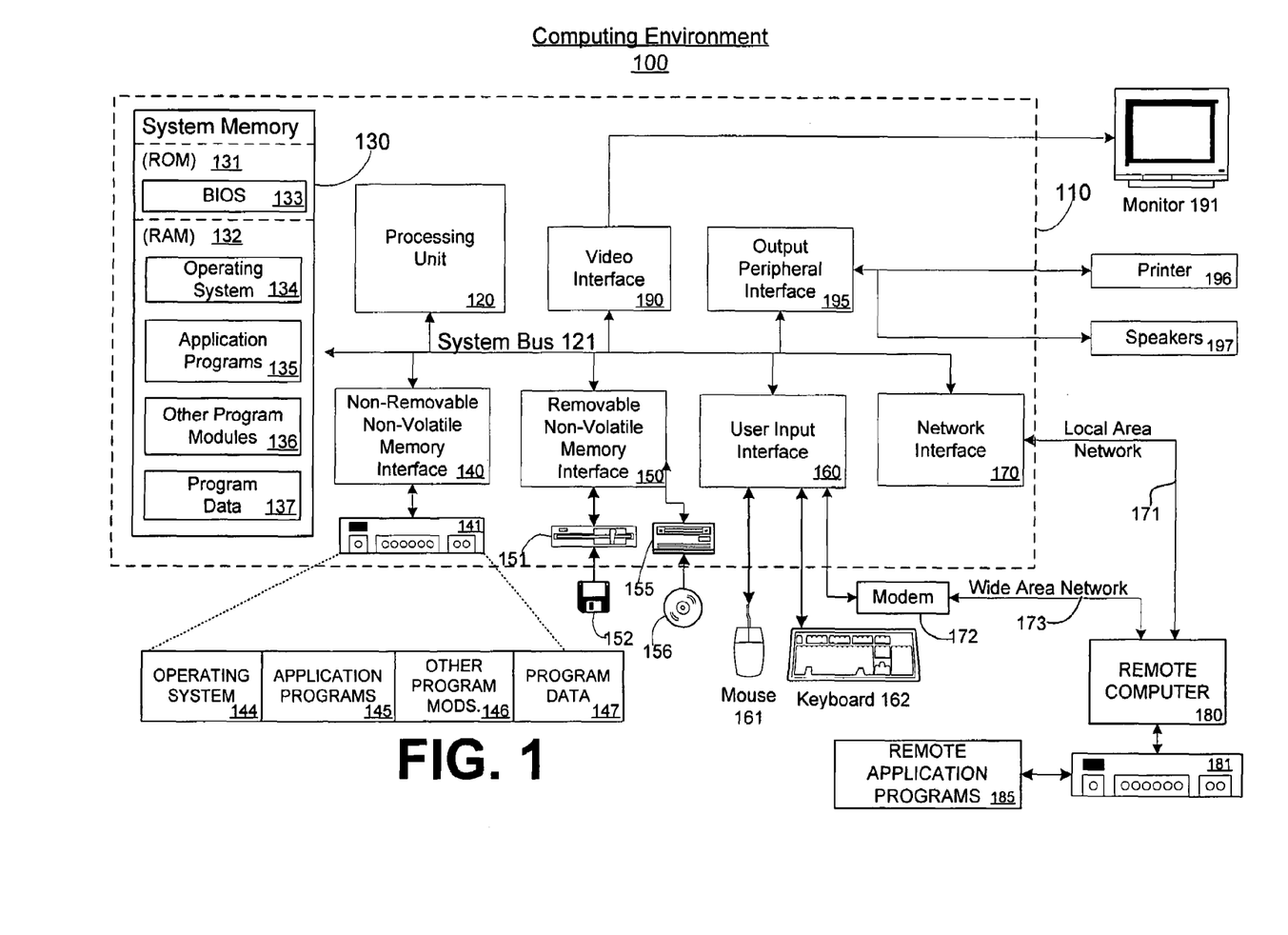
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Preserving Source Code Formatting

Figure 2:
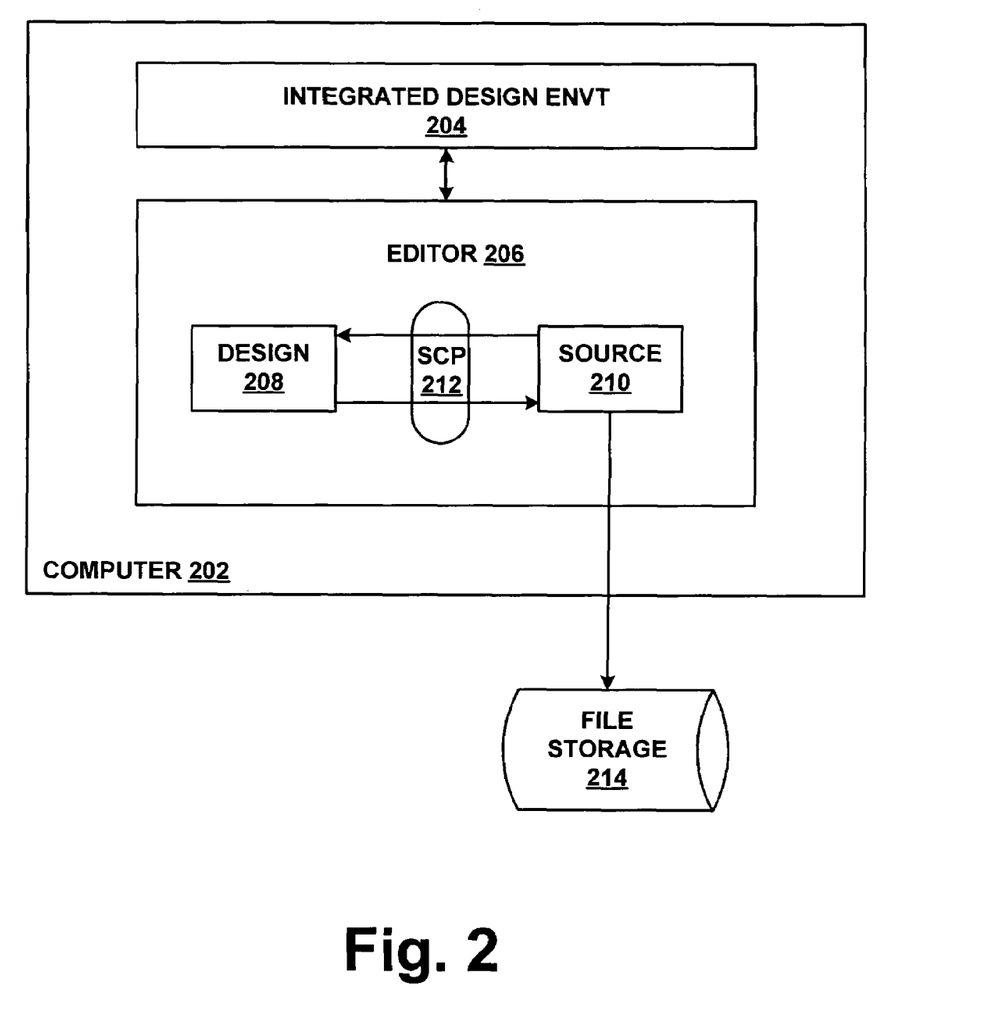
FIG. 2 is a block diagram of an exemplary system for preserving source code formatting in accordance with one embodiment of the invention.

FIG. 2 is a block diagram of a high level view of a system for preserving source code formatting in accordance with one embodiment of the invention. Computer 202 may be a computer such as computer 110 described with respect to FIG. 1. Integrated design environment 204 may be any design environment such as MICROSOFT's VISUAL STUDIO®, Macro Media Dreamweaver UltraDev, IBM WebSphere Studio, Adobe GoLive, Namo WebEditor 5 and others. Editor 206 may represent a source code editor for any programming language, including but not limited to Ada95, Algol, APL, BASIC, C, C#, C++, Clips, COBOL, Common Lisp, Component Pascal, Concurrent Pascal, Delphi, Eiffel, F#, Forth, FORTRAN, Haskell, Java, JavaScript (ECMAScript), Jess, Joy, Lisp, M, Mercury, ML, Modula-2, NewtonScript, Oberon, Objective C, ocaml, occam2, OPS5, OPS-5, Perl, Perl 5, PHP, Pict, Poplog, PostScript, PowerBuilder, Prolog, Python, Q, Rapira, Ruby, Sather, Scheme, Self, Simula, Smalltalk, TCL, VBScript, or VISUAL BASIC®. It will be understood that although integrated design environment 204 is shown in FIG. 2 independent of editor 206, the invention as contemplated is not so limited, that is, editor 206 may be included within integrated design environment 204.

Editor 206 may include a design mode module 208 and a source mode module 210. Design mode module 208 may display the source code as rendered by a browser or runtime. Exemplary design modes may include but are not limited to a renderer for HTML (e.g., a browser such as MICROSOFT's INTERNET EXPLORER® or NETSCAPE®, Mozilla, Firebird, Camino, etc.) or a runtime for code written in MICROSOFT's VISUAL BASIC®. Source code may be saved by the source mode module 210, the design mode module 208 or both. Source code (not shown) may be stored in file storage 214.

The source code preservation module 212 may be integrated within a design environment or editor or may be a stand-alone feature. For example, the source code preservation module 212 may implemented as a command line feature. Additionally, although discussed herein as a differencing tool for source code, it will be apparent that the invention is not so limited, that is, the source code preservation module is capable of detecting differences and preserving original formatting in any type of text files or documents.

Figure 3A:
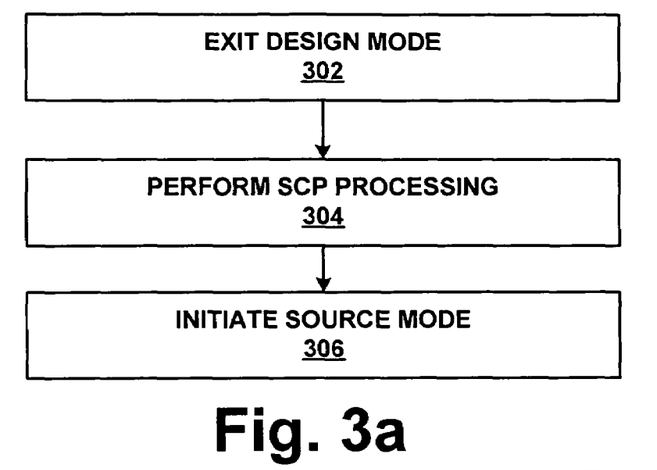
FIGS. 3a and 3b are flow diagrams of an exemplary method for preserving source code formatting in accordance with embodiments of the invention
Figure 3B:
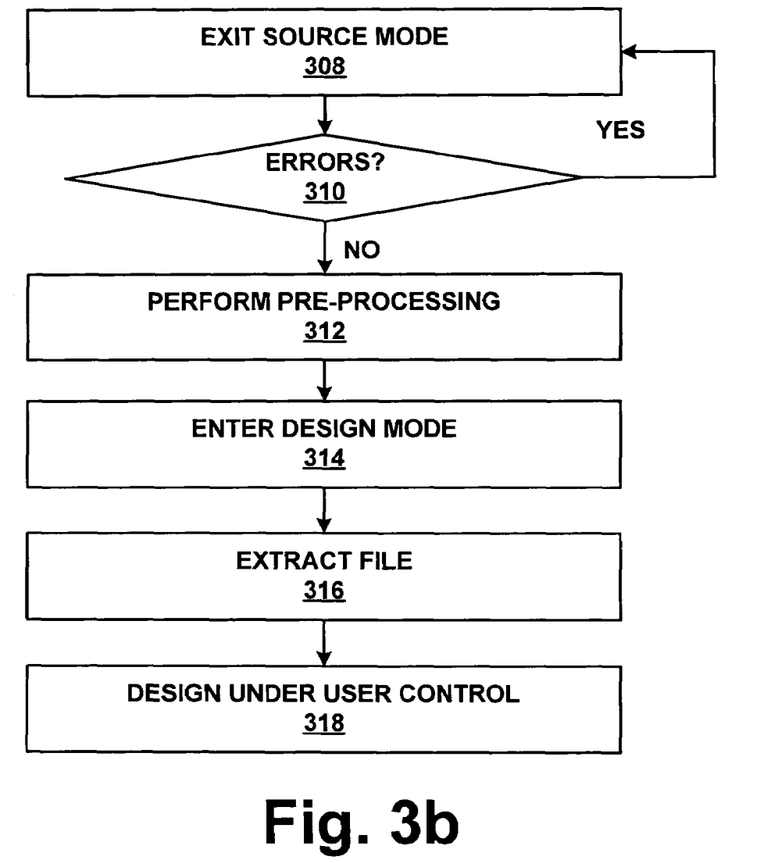

In some embodiments of the invention, the source code preservation module 212 is invoked whenever a user switches from source mode to design mode and/or whenever a user switches from design mode to source mode. FIGS. 3a and 3b illustrate exemplary methods of preserving source code formatting in accordance with embodiments of the invention.

Referring to FIG. 3a, the source code preservation module may be invoked whenever a switch is made from design mode to source mode or when a save is performed in design mode or by changing focus from a source code window to a design window (as for example, in a concurrent view style system) or by waiting a specified period of time or by other suitable triggering events (step 302). Upon exiting from design mode, a source code preservation module in accordance with some embodiments of the invention, may find user changes made during design mode by comparing the document before and after editing and applying the changes to the original document, thus preserving the original formatting of the document (step 304) before entering source mode (step 306).

Referring to FIG. 3b, the source code preservation module may be invoked whenever a user switches from source mode to design mode. At step 308, an indication is received that source mode is to be exited and design mode entered (step 308). At step 310 the source code is validated for errors such as but not limited to duplicate <body> tags, text before the <html> tag or <body> tag and so on. When these particular types of errors (for example, errors making format recovery more error-prone) are found, the switch is blocked until the error is corrected (step 310). At step 312, pre-processing of the source code is performed. For example, elements that are commonly encountered are uniquely identified in this step. More specifically, a unique identifier may be added to each HTML markup tag. This process is described more fully below. At step 314, design mode is entered. At step 316 the file as modified by the design mode module but before any user edits are made, is extracted or saved. At step 318 control of the design environment is passed to the user.

The methods described in FIGS. 3a and 3b can be repeated any number of times.

Figure 4A:
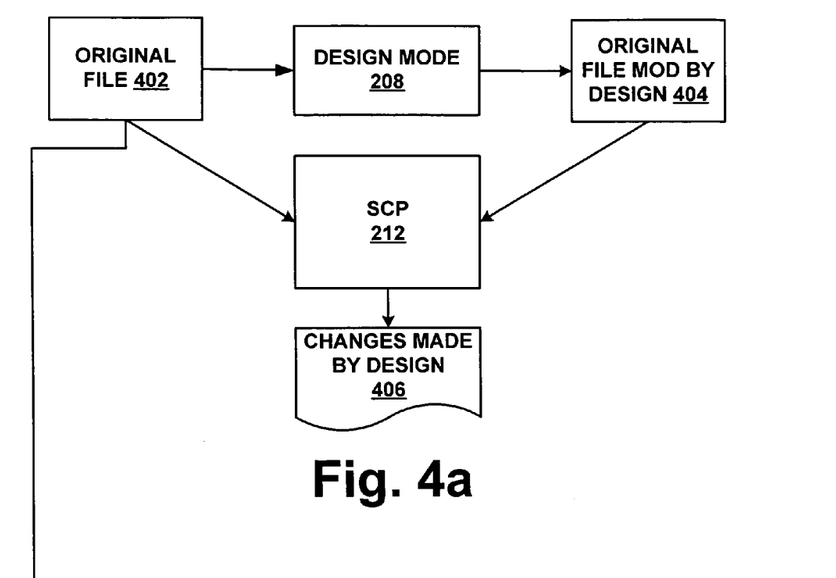
FIGS. 4a and 4b are more detailed block diagrams of a system for preserving source code formatting in accordance with one embodiment of the invention.

FIGS. 4a and 4b are block diagrams illustrating a more detailed view of the source code preservation system in accordance with one embodiment of the invention. In FIG. 4a, an original unedited file 402 (perhaps a file coming from source mode, for instance) is loaded into the design mode module 208. The design mode module 208 may make automatic changes to the original unedited file 402. One example of an automatic change may occur with the <li> markup tag. For example, the following portion of HTML text:

```
<ul>
<li>test1
<li>test2
</ul>
``` may be converted to:

```
<ul>
<li>test1</li>
<li>test2</li>
</ul>
``` by the design mode module 208.

These changes, in some embodiments, are saved in file 404, the original file as modified by the design mode module 208. Changes made by the design mode module 208 are determined by the source code preservation module 212 by comparing the original unedited file 402 and the original file as modified by design mode module 404. In some embodiments, these changes may be saved in a document or temporary file 406.

Figure 4B:
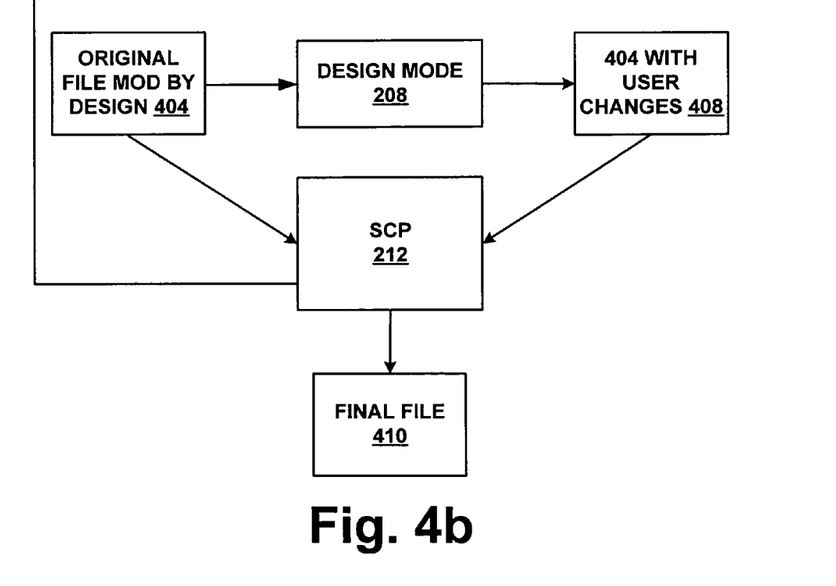

In FIG. 4b the original file as modified by design mode module, file 404, is modified by user edits. Before this point, user changes were unable to be made. When exiting from design mode, file 404 as modified by any changes made by the user in design mode is saved as file 408. The final output text stream (e.g., file 408) may be used as input to the next mode. Source code preservation module 212 compares original file 402, the original file as modified by the design mode module 404 and the file modified by the design mode module as modified by the user to preserve the original source code formatting.

Figure 5A:
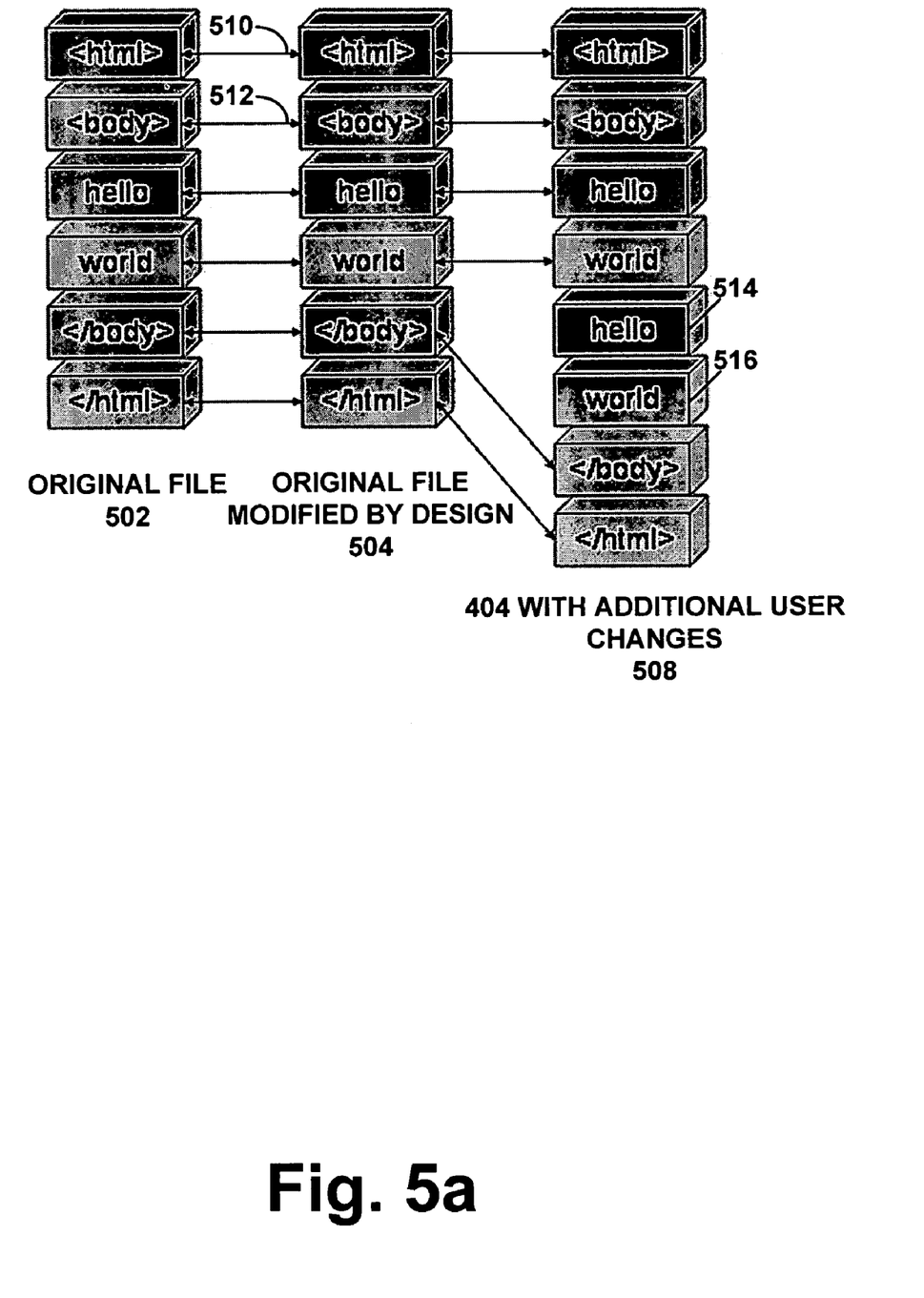

The final output text stream (e.g., file 408) in some embodiments of the invention begins as an exact copy of the blocks from original file (e.g., original file 402), to which insertions, moves and deletions are performed. FIGS. 5a-5f are illustrations of exemplary files as manipulated by the source code preservation system. An exemplary original file is illustrated in FIG. 5a, reference numeral 502. In the example shown in FIG. 5a, the design mode module has made no changes to original file 402 so the file output from the design mode, file 504, is identical to original file 502, however the invention as contemplated is not so limited. Moreover, white space characters such as carriage return, line feed, tab, space and so on are considered "white space" and are not included within a block but can be considered data between blocks. Hence there is an exact one-to-one mapping between original file 502 and the file output from the design mode 504, as shown by arrows 510, 512, etc., pointing from a block in file 502 to an identical block in file 504, and so on. Similarly, in the example, all the blocks in file 504 map to blocks in file 508. If a block in file 508 does not map to a block in file 504, the implication is that the block was created by a user edit in design mode. Blocks 514 and 516 in file 508 do not point to blocks in file 504, hence blocks 514 and 516 have been inserted as a result of user edits. A block is created in the final file for each inserted block.

Figure 5B:
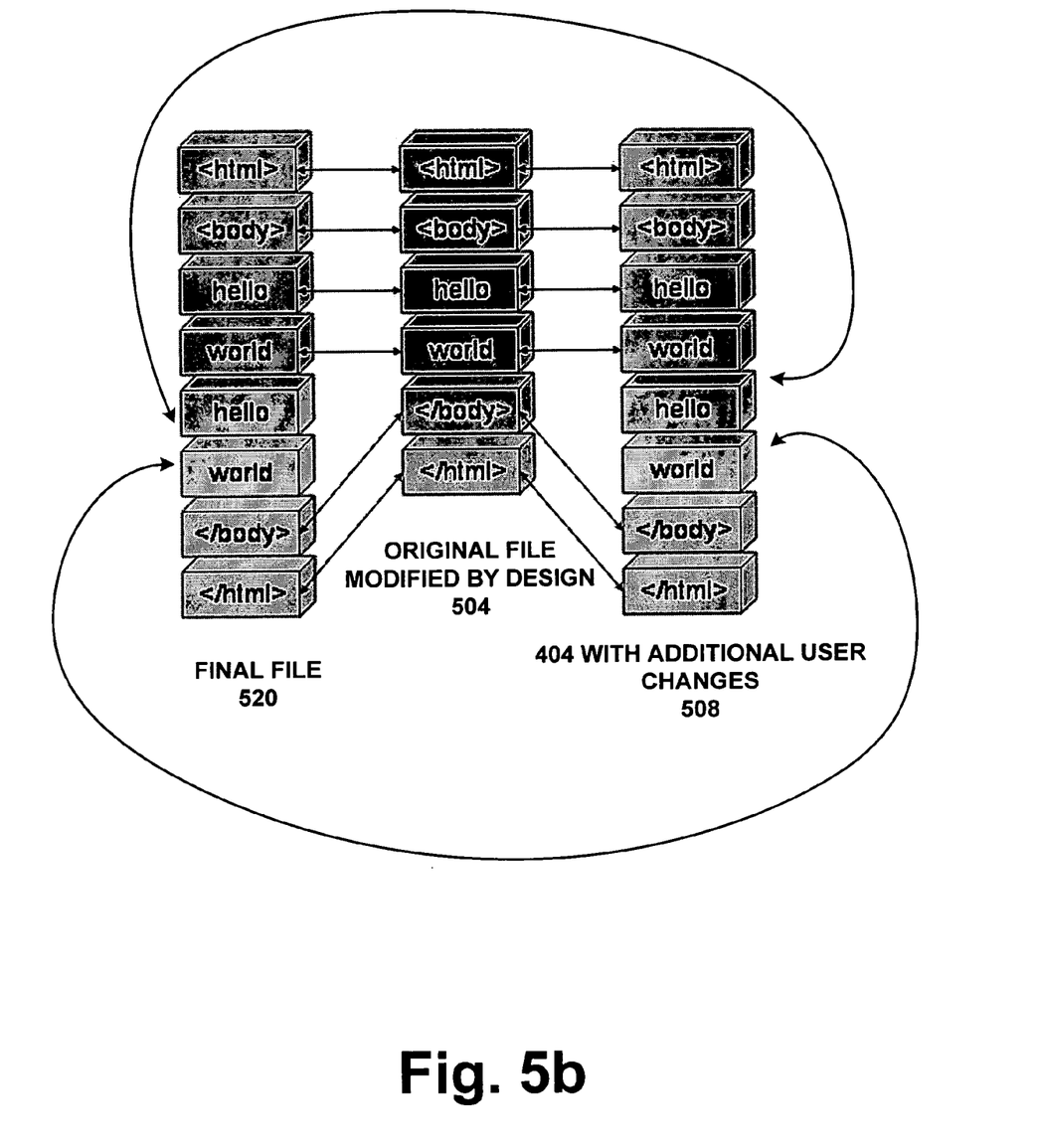

FIG. 5b illustrates final file 520, after insertion of blocks 514 and 516 from file 504. Blocks 522 and 524 are inserted into final file 520. Blocks 522 and 524, in some embodiments, point to corresponding blocks in file 508.

Figure 5C:
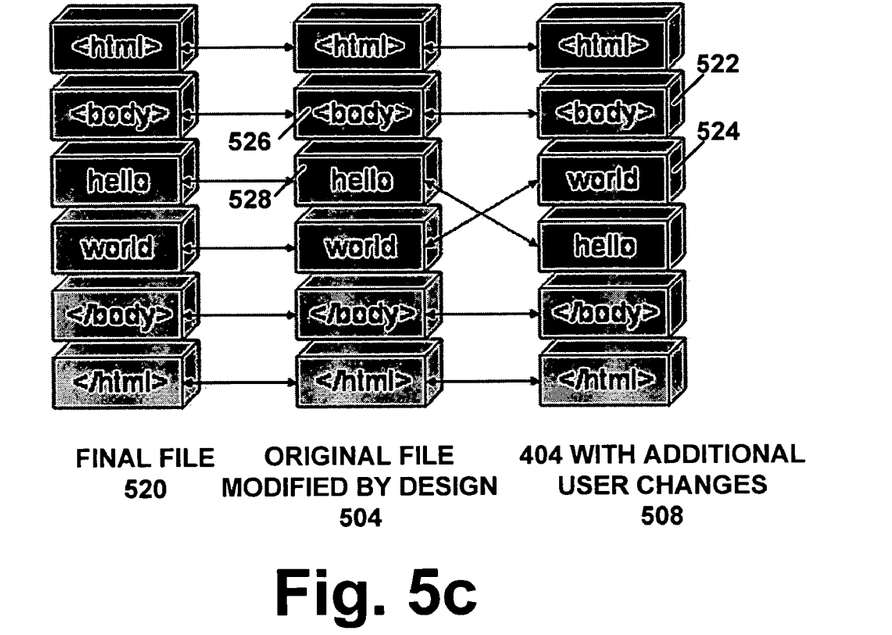
Figure 5D:
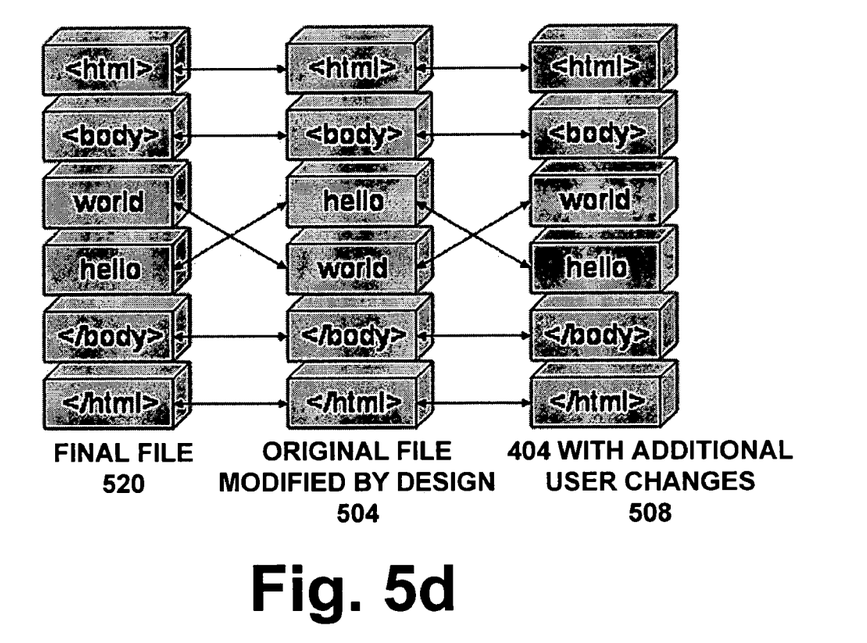

FIGS. 5c-d illustrate a move. If two unique blocks in the file that is output from design mode after user edits, (e.g., file 508), are adjacent but their corresponding blocks in the file modified automatically by the design mode, file 504, are not adjacent, the implication is that the second block has moved to a new position. In the example, all HTML markup tag blocks (for example, block 522 in file 508 and block 526 in file 504) are uniquely identified, as described more fully below. In FIG. 5c, unique block 522 "<body>" in file 508 is followed by unique block 524 "world", however, corresponding unique block 526 "<body>" in file 504 is not followed by a block containing "world" but instead is followed by a block 528 containing "hello", suggesting that "world" 524 has been moved by a user edit. FIG. 5d illustrates final file 512 after application of the move.

Figure 5E:
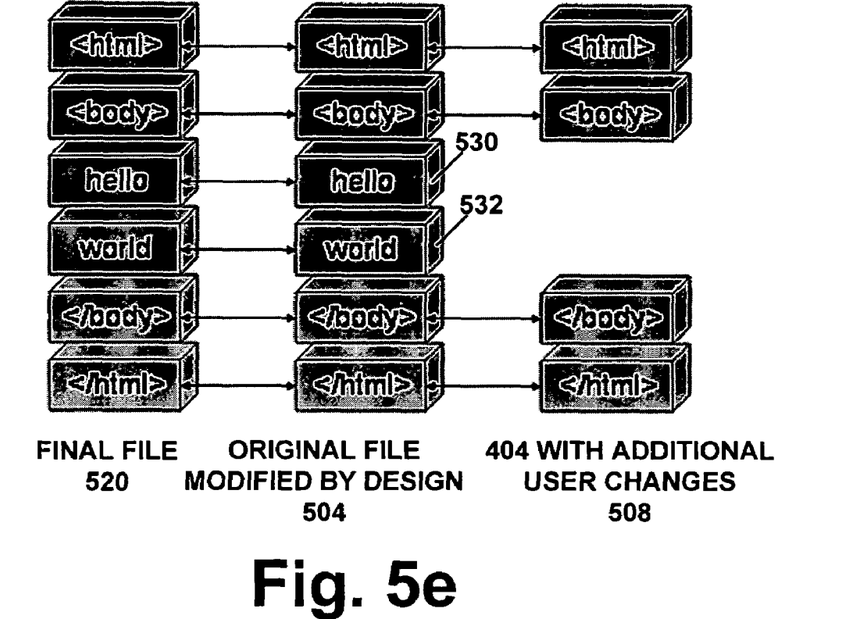
Figure 5F:
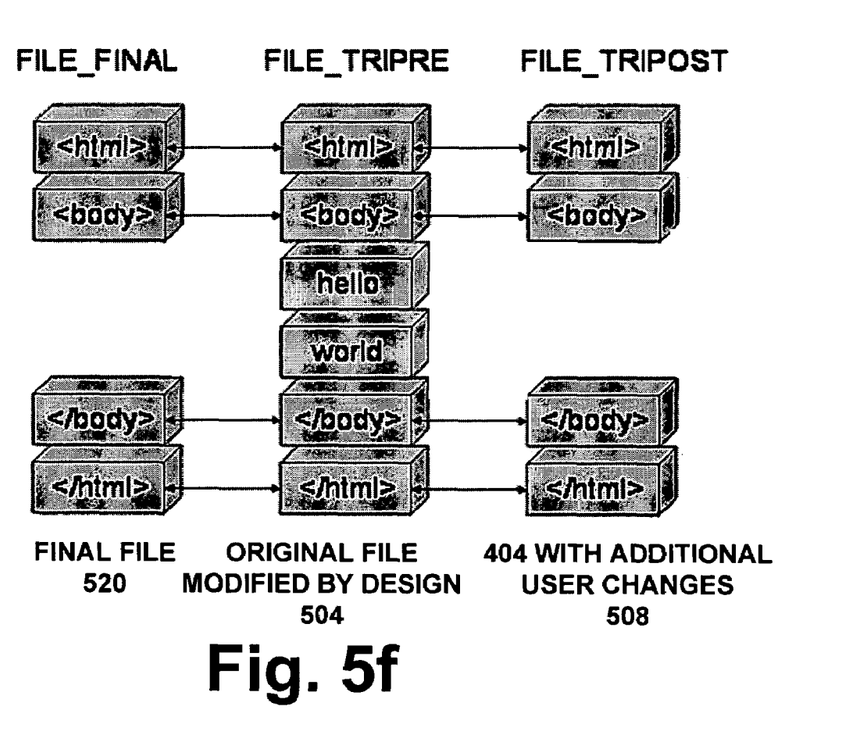

FIGS. 5e-5f illustrate a delete. If a block in file 504, the original file as modified by the design module before user edits, does not map to a block in file 58, the implication is the block has been deleted in design mode. For example, in FIG. 5e blocks 530 and 532 do not map to blocks in file 508. FIG. 5f shows final file 512 after the delete is processed.

After all the inserts, moves and deletes are processed, each of the blocks in the final file points either to a block in the original file or to a block in file 508, enabling the final file to recover the old source formatting for all the original blocks. New blocks are formatted according to a set of rules (best guesses as to how a user might like to see the line) in some embodiments of the invention. To display or print the document with the original formatting, the blocks in the final file are walked and if two adjacent blocks point to two adjacent blocks in the original file, the original formatting that existed between the two blocks can be recovered. If two adjacent blocks do not point to two adjacent blocks in the original file, if both blocks point to blocks in file 508 or if one block points to a block in the original file and one block points to file 508, the blocks are formatted according to a set of best-guess rules.

To capture changes made within markup blocks, for markup blocks that exist in the original file, the file 504 and file 508, the attribute lists of the markup in 504 and 508 are compared to find out how the attributed changed (insert, delete and change). The markup is then regenerated using the existing formatting in the original file with updated attribute values.

Files may be compared using any technique for text differencing. For example, files may be scanned and whenever a difference is detected, the next m lines may be scanned until n consecutive lines are found. Alternatively text differencing can be determined by finding a longest common sequence in two files, file A and file B, deleting the sequence from files A and B, and saving the deleted sequence in file C. By scanning files A, B and C and flagging characters that appear in A but not in C one way and flagging those that appear in B but not in C in another way, text differencing can be determined.

Alternatively, text differencing can be determined and file mapping can be accomplished as follows by using the following observations:

1. A text block that occurs once and only once in each file must be the same text block (although the text block may have been moved). This finds most blocks and excludes them from further consideration.

2. If, immediately adjacent to a "unique found" block pair (one block in each file) there are blocks identical to each other, these blocks must be the same block. The process is applied forwards and backwards from unique blocks to find sequences of unchanged blocks. By applying these observations, mappings between blocks in the two files can be generated.

Figure 6:
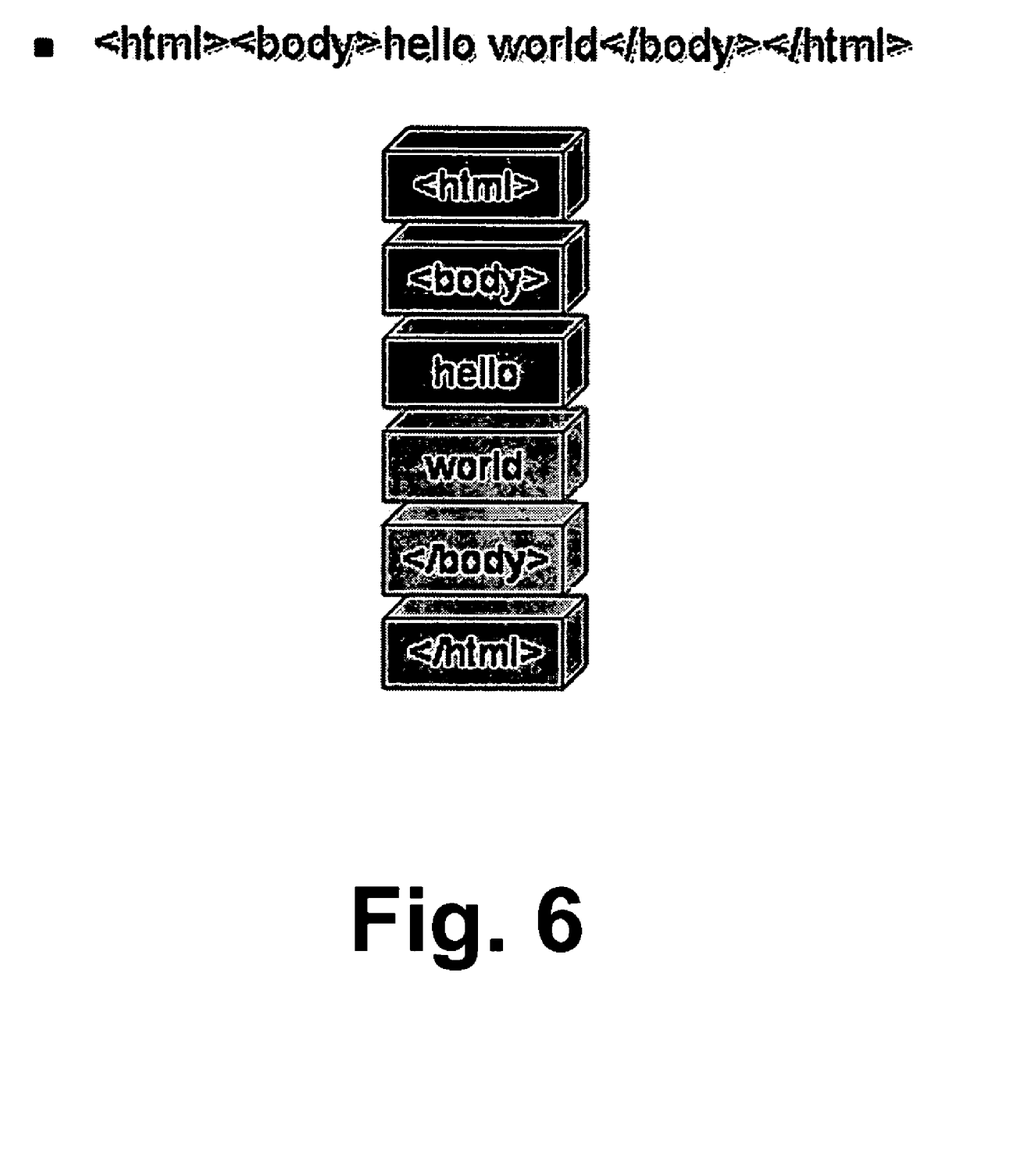
FIG. 6 is another exemplary file with respect to source code formatting preservation in accordance with one embodiment of the invention.

For example, suppose a file contains the following:

<html><body>hello world</body></html>

FIG. 6a illustrates an exemplary array that may be generated from the file. As can be seen from FIG. 6a, passages of HTML may be treated as a single block. Each HTML markup character <p>, </p>, <body>, </body>, etc. may be uniquely identified by inserting an attribute into the markup stream exiting source mode and entering design mode. One possible attribute that may be used to provide unique identification of HTML markup tags may be, for example, a number which is sequentially incremented for each new piece of markup encountered. When exiting design mode and entering source mode, these unique identifiers may be removed. In some embodiments of the invention, the unique identifiers are not visible in desgin mode.

Figure 7A:
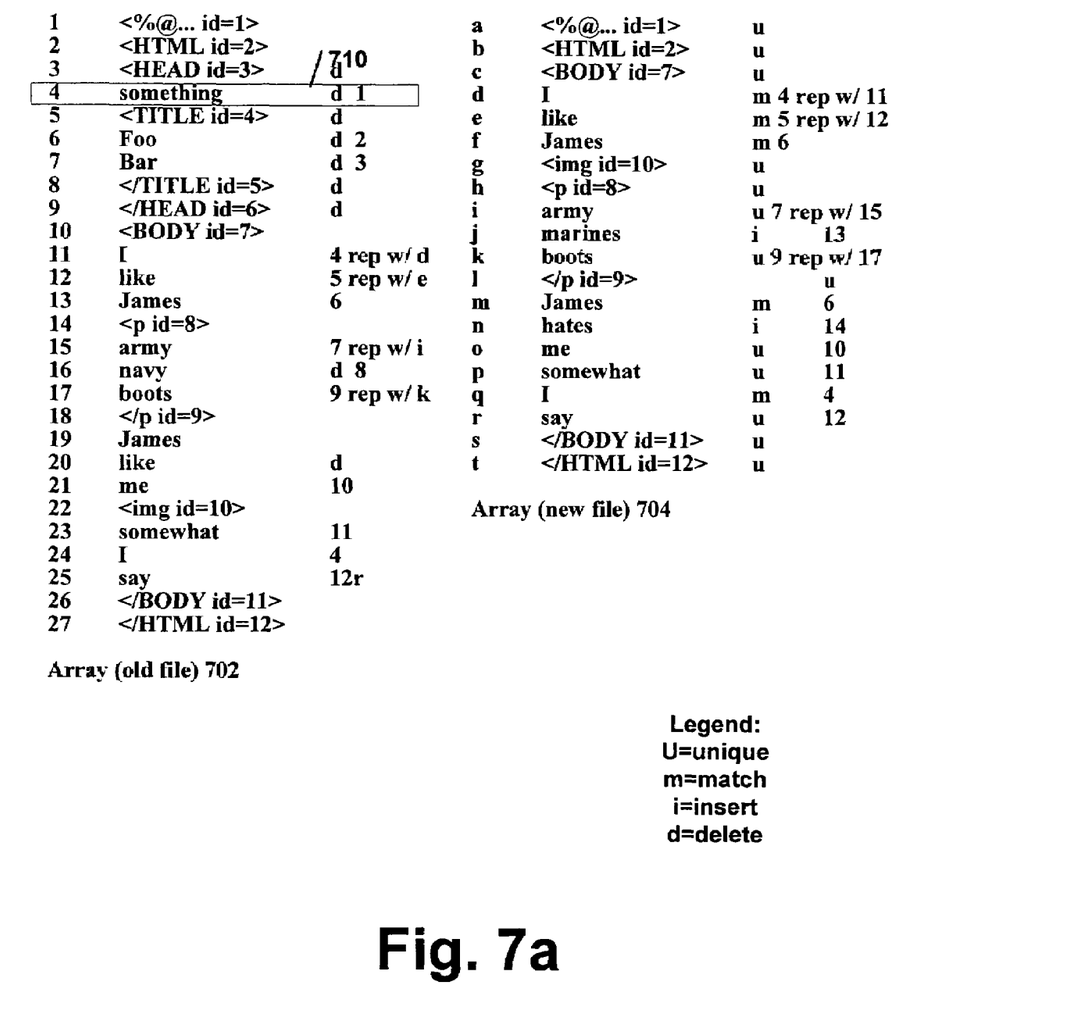
FIGS. 7a and 7b illustrate exemplary data structures in accordance with one embodiment of the invention.

In some embodiments of the invention, to determine differences between an original file (old file) and a file as modified by the design mode module (new file), or to determine differences between the file as modified by the design mode module (old file) and the file after user edits (new file), an array or other suitable data structure may be generated for the old file and an array may be generated for the new file. The old file array may include one entry for each block of text in the old file and the new file array may include one entry for each block of text in the new file. FIG. 7a illustrates an exemplary array 702 for the old file and an exemplary array 704 for the new file.

Figure 7B:
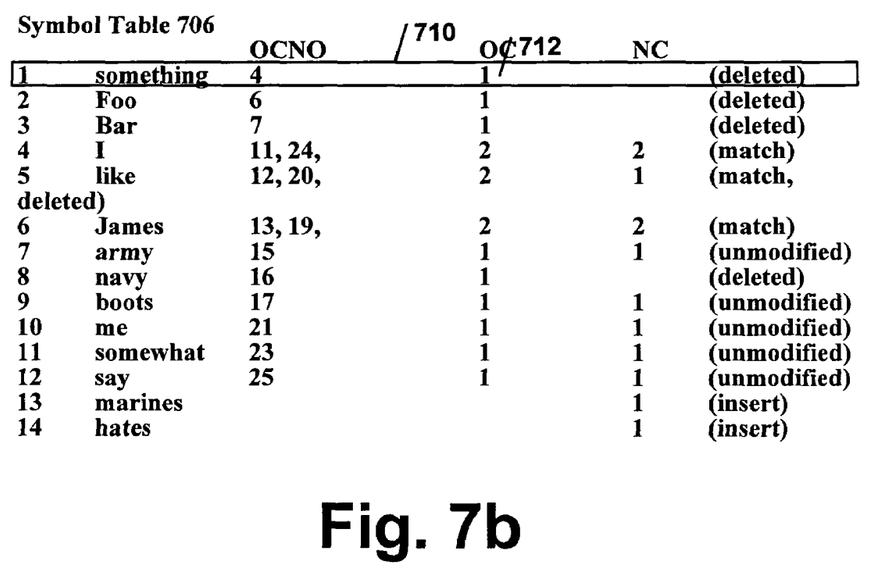

A symbol table (as illustrated in FIG. 7b by exemplary symbol table 706) is created by reading each block of the old file array 702 and generating an entry in the symbol table for each block of the old file if it does not already exist, keyed on the content of the block. For example entry 1 708 is generated for block 4 710 (something) of array 702 and so on. A counter OldFileBlockCounter in the symbol table representing the number of times a block is encountered in the old file, is incremented. For example in entry 708, "something" is found in old file array 702 once (712). The corresponding block in the old file array is set to point to the table entry. For example array element 4 (710) is set to point to symbol entry 1. Finally, a field OldFileBlockNumber in the symbol table is set to the block number of the text in the old file. For example, OldFileBlockNumber for entry 1 708 is set to 4, the location of the block "something" in old file 702.

The new file is then read and the symbol table is updated for each block in the new file. For example, entries 13 and 14 of symbol table 706 are added. A counter (NewFile-BlockCounter) representing the number of times a block is encountered in the new file is incremented. The corresponding block in the new file array is set to point to the corresponding table entry.

Using observation 1, any entries in the symbol table for which NewFileBlockCounter=OldFileBlockCounter=1 represent unmodified blocks. For these blocks, the symbol table pointers are replaced by the number of the block in the other line. For example, for entry 7, NewFileBlockCounter=OldFileBlockCounter=1. Thus for block 15 in old file, (army) entry 7 is replaced with i, the location of "army" in new file and in new file, block I (army) entry 7 is replaced with 15, the location of "army" in the old file. That is, new file(i) (army) is set to OldFileBlockNumber (15) and old file (OldFileBlockNumber) (that is, old file (15)) is set to i.

Using observation 2, each line in the old file is processed in ascending order. If old file (x) points to new file (y) and old file (x+1) and new file (y+1) contain identical symbol table pointers, the new file (y+1) is set to x+1 and old file (x+1) is set to y+1. That is, because old file (11) points to new file (d) and old file (12) and new file (e) contain identical symbol table pointers (4), new file (e) is set to 12 and old file (12) is set to e.

Using observation 2, each line in the old file is processed in descending order. If old file (x) points to new file (y) and old file (x−1) and new file (y−1) contain identical symbol table references, the new file (y−1) is set to x−1 and old file (x−1) is set to y−1. That is, because old file (12) points to new file(e) and old file(11) and new file(d) contain identical symbol table pointers (4), new file(d) is set to 11 and old file(11) is set to d.

Array old file 702 now contains the information needed to list the differences between the files. If old file(x) points to a symbol table entry, it can be assumed that block x is an insert. If old file (x) points to new file(y) but old file(x+1) does not point to new file(y+1), there has been a deletion or move.

In some embodiments of the invention, one symbol table is created for text and a second symbol table is created for markup tags, but alternatively, a single table may be created for both text and markup tags.

When the final file has been created, the formatting of the original file is recovered because two adjacent blocks in the final file are mapped to the original file, and the formatting between the blocks in the original file is reapplied to the HTML file output. Thus, blocks are utilized to recognize the similarity between the documents and the carriage return, line feed, tab and space characters between the blocks are re-created in the output by outputting the block (either text or markup), determining what the formatting should be between the previously output block and the next block to be output. The formatting is determined by tracing back to the original file to get the formatting information. Tracing the final block to the original block is accomplished by searching the symbol table as described above.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the embodiments of the various figures, it is to be understood that other similar embodiments may be used or modifications and additions may be made to the described embodiments for performing the same function of the present invention without deviating therefrom. Similarly it will be understood that although the invention is described within the context of an integrated design environment for HTML, the invention is not so limited and may be used wherever maintaining the original format of a text file is useful. Therefore, the present invention should not be limited to any single embodiment, but rather should be construed in breadth and scope in accordance with the appended claims.

What is claimed is:

1. A system for preserving original formatting characters in a text file that is edited in a software development environment, the system comprising:
    a software development environment editor, the editor comprising software that inputs an original text file having original formatting characters and produces a first modified text file, the first modified text file having both original text and automatic formatting character modifications made by the editor, the editor accepting user changes to the first modified text file to produce a second modified text file having the automatic formatting character modifications and the user edits;
    a source code preservation module that receives the original text file, compares the first modified text file with the second modified text file to find a modified block of text and applies the modified block of text to the original text file to generate a final file with the original formatting characters, whereby the source code preservation module preserves the original formatting characters in the final file.

2. The system of claim 1, wherein the final file comprises source code.

3. The system of claim 1, wherein the final file comprises HTML.

4. The system of claim 1, further comprising a design mode module.

5. The system of claim 4, wherein the design mode module displays the original text file as rendered by a browser.

6. The system of claim 1, further comprising a source mode module.

7. The system of claim 6, wherein the source mode module comprises a source code text editor.

8. A method for preserving formatting of an original file comprising:
    receiving the original file, the original file associated with a first character formatting;
    receiving a first modified file, the first modified file associated with a second character formatting, the first modified file having character formatting modifications made automatically by a software development system editor and the original file text;
    receiving a second modified file, the second modified file comprising the first modified file with user text edits;
    comparing the first modified file and the second modified file to determine at least one text modification; and
    applying the at least one text modification to the original file to generate a final file having the first character formatting, wherein the formatting of the original file is preserved in the final file.

9. The method of claim 8, wherein the original file is an HTML file.

10. The method of claim 8, wherein the first modified file is an HTML file.

11. The method of claim 8, wherein the final file is an HTML file.

12. The method of claim 8, wherein the second modified file comprises the output of a source code text editor.

13. The method of claim 8, wherein the first modified file comprises the output of a design mode module.

14. The method of claim 8, wherein comparing the first modified file and the second modified file to determine at least one text modification comprises:
   copying the original file to a final file;
   mapping text blocks from the first modified file to the second modified file;
   in response to determining that a text block in the second modified file has no corresponding text block in the first modified file, inserting the text block in the final file.

15. The method of claim 8, wherein comparing the first modified file and the second modified file to determine at least one text modification comprises:
   copying the original file to a final file;
   mapping blocks from the first modified file to the second modified file:
   in response to determining a first unique text block and a second unique text block in the second modified file are adjacent and the corresponding first unique text block and corresponding second unique text block in the first modified file are not adjacent, moving the second unique text block to a position adjacent to the corresponding first unique text block in the final file.

16. The method of claim 8, wherein comparing the first modified file and the second modified file to determine at least one text modification comprises:
   copying the original file to a final file;
   mapping blocks from the first modified file to the second modified file;
   in response to determining that a text block in the first modified file has no corresponding text block in the second modified file, deleting the text block in the final file.

17. A computer-readable medium comprising computer-executable instructions for preserving character formatting of an original HTML file, the computer-readable instructions directing a computer to perform a method comprising:
   receiving the original HTML file, the original HTML file associated with a first character formatting;
   receiving a first modified HTML file, the first modified HTML file associated with a second character formatting, the first modified HTML file having character formatting modifications made automatically by a software development editor and the original HTML file text;
   receiving a second modified file, the second modified file comprising the first modified file with user text edits;
   comparing the first modified HTML file and the second modified HTML file to determine at least one text modification; and
   applying the at least one text modification to the original HTML file to generate a final HTML file having the first character formatting, wherein the formatting of the original HTML file is preserved in the final file.

18. The computer-readable medium of claim 17, comprising further instructions for:
   copying the original file to a final file;
   mapping text blocks from the first modified file to the second modified file;
   in response to determining that a text block in the second modified file has no corresponding text block in the first modified file, inserting the text block in the final file.

19. The computer-readable medium of claim 17, comprising further instructions for:
   copying the original file to a final file;
   mapping blocks from the first modified file to the second modified file:
   in response to determining a first unique text block and a second unique text block in the second modified file are adjacent and the corresponding first unique text block and corresponding second unique text block in the first modified file are not adjacent, moving the second unique text block to a position adjacent to the corresponding first unique text block in the final file.

20. The computer-readable medium of claim 17, comprising further instructions for:
   copying the original file to a final file;
   mapping text blocks from the first modified file to the second modified file;
   in response to determining that a text block in the first modified file has no corresponding text block in the second modified file, deleting the text block in the final file.

* * * * *